Oct. 9, 1928.

H. H. ALEXANDER 1,687,277

METHOD AND APPARATUS FOR PURIFYING METALS

Filed Oct. 28, 1925

INVENTOR
Harry H. Alexander
BY
Albert M. Austin
ATTORNEY

Patented Oct. 9, 1928.

1,687,277

UNITED STATES PATENT OFFICE.

HARRY H. ALEXANDER, OF WESTFIELD, NEW JERSEY.

METHOD AND APPARATUS FOR PURIFYING METALS.

Application filed October 28, 1925. Serial No. 65,309.

The present invention relates to a method for the melting and refining of metals from the ore, from the crude metal, or from metal in intermediate stages of refining. The invention further relates to a method for controlling the combustion of the gases in a reverberatory, stack or other furnace to remove impurities from the metal and to prevent impurities from passing thereinto from the fuel used for melting the metal.

In the refining of copper, for example, in a reverberatory furnace, the metal is melted by heated gases in contact therewith. These gases may be products of combustion of coal, or oil, or producer gas, or powdered coal may be blown into the combustion chamber and burned. A stream of air is passed through the metal bath, or the bath is actively agitated to expose it to air carried through the chamber for the purpose of oxidizing impurities in the metal. These impurities are either volatilized or they pass into the slag as oxide. After the completion of the oxidizing step the slag is removed from the metal and the metal then deoxidized in a suitable manner as by poling.

The present invention consists in new and novel methods of operation of a furnace for the melting of metals and of new and original arrangements and combinations of steps in the process hereinafter described and more particularly set forth in the claims. The invention further consists in new and novel combinations of parts for controlling the composition and nature of the gases over the bath in the combustion chamber and of materials carried by such gases as hereinafter set forth and claimed.

According to this invention metal, such as blister copper, or copper cathodes, is melted by a stream of hot gases as in a reverberatory furnace or a stack furnace, during which melting the nature of the gas is controlled in accordance with the nature of the impurities in the furnace charge. This control may be maintained by varying the proportion of air and fuel admitted to the furnace. To provide a neutral atmosphere, just sufficient air is mixed with the fuel to oxidize the fuel, to produce an oxidizing atmosphere sufficient excess of air over that required for burning the fuel is admitted to oxidize impurities in the charge, and to produce a reducing atmosphere the proportion of air to burning fuel is reduced.

Further, according to this invention the charge is melted at its surfaces exposed to the hot gases and simultaneously therewith the impurities exposed upon the melting of the charge at its surfaces are oxidized or otherwise made to combine with the melting gases and are carried away by the stream of gases. The metal which melts from the charge is permitted to drain away and leave a new charge surface exposed for the removal of impurities therefrom and for the simultaneous and subsequent melting therefrom of additional metal. This process then is progressive and is a combination of the removal of molten metal from a charge surface and the removal of impurities exposed by such removal from the charge surface. The removal of the impurities and of the metal from the charge is more or less simultaneous.

In the case where an oxidizing reaction is necessary the atmosphere is controlled to eliminate the impurities entirely or an optimum quantity thereof.

The metal which drains away from the charge is sampled and tested from time to time to ascertain the degree of purity thereof, and the atmosphere of the melting gases is accordingly regulated to remove the impurities which upon test have been determined to be contained in the charge.

Various other objects and advantages of the invention will be obvious from the following particular description of one form of apparatus embodying the invention and of processes and methods carried on therewith or from an inspection of the accompanying drawings.

In the drawing there is shown somewhat diagrammatically a reverberatory furnace having a depression in the hearth for receiving metal flowing thereto from another part of the hearth where the melting is carried on. Means are also shown for controlling the atmosphere over the hearth to make it either oxidizing, reducing or neutral as desired or required.

In the accompanying drawings, I have shown for purposes of illustration one form of mechanism with certain modifications thereof embodying the invention, in which Fig. 1 is a plan view in part section showing a reverberatory furnace having a depression at the rear thereof for receiving metal which drains from the charge on a higher portion of the hearth which slants downwardly towards said depression, and fuel blowing and air blowing means opening into the furnace are also shown;

Figure 1:
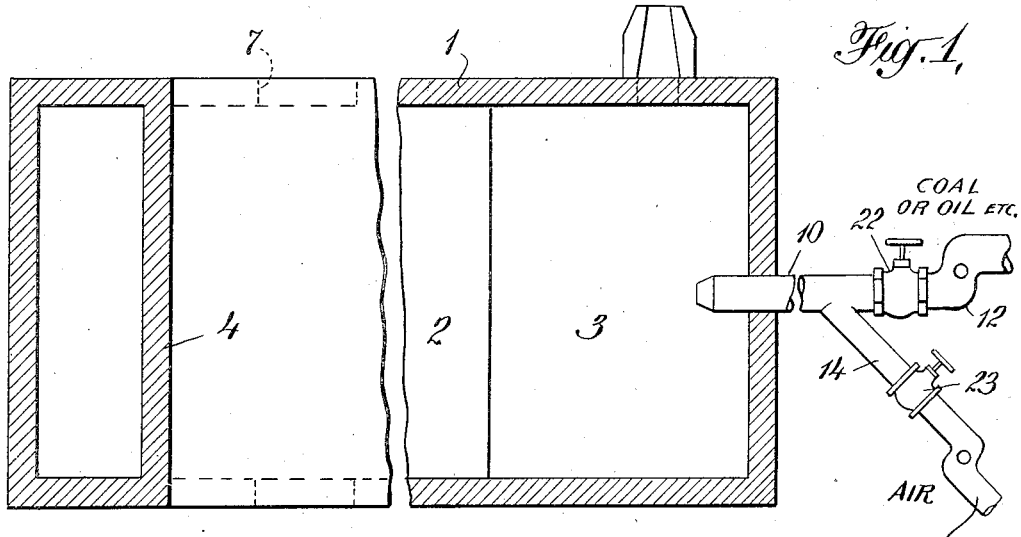
Figure 2:
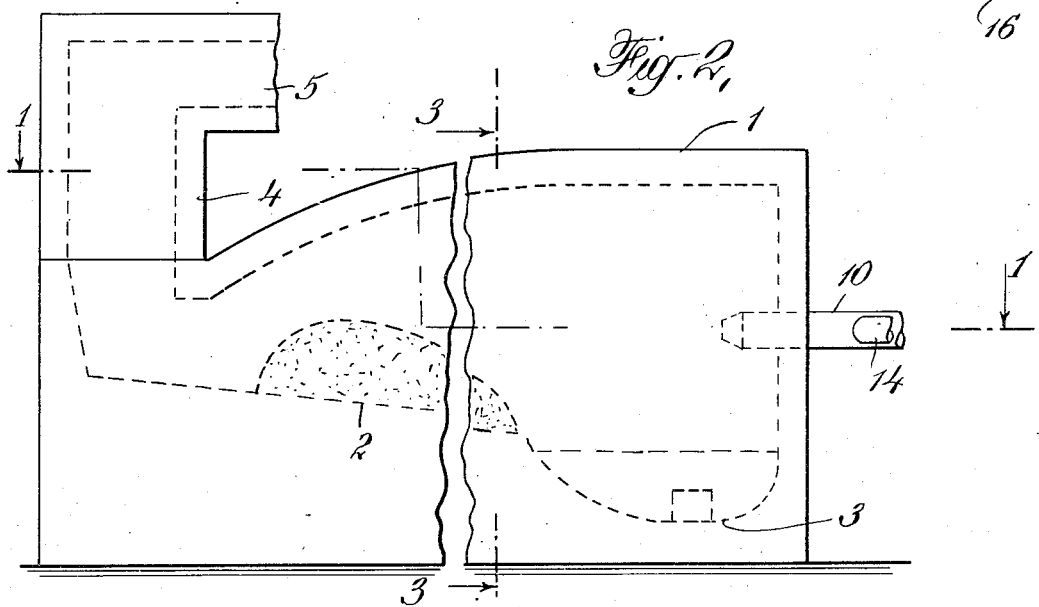
Fig. 2 is a side elevation of the furnace of Fig. 1.
Figure 3:
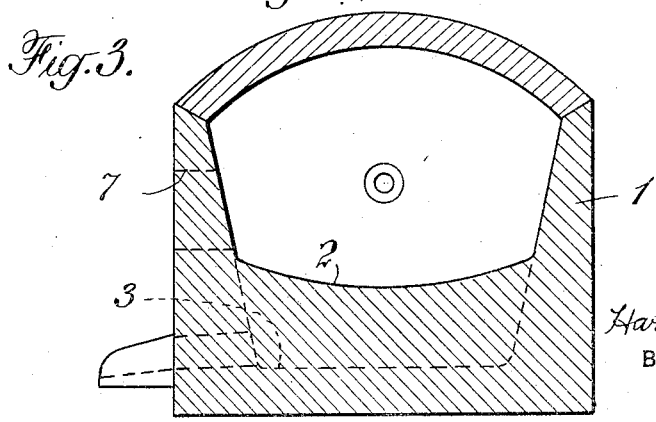
Fig. 3 is a vertical sectional view taken on the line 3—3 and looking in the direction of the arrows in Fig. 2.

In the drawings the reverberatory furnace 1 has a hearth 2 which slants from the front of the furnace backwardly to the depression 3 formed therein at the back of the furnace. As shown in Fig. 3 the hearth 2 is lower at its center than at its sides to collect and carry away molten metal from the charge. At the front of the hearth is the stack 4 which connects through the flue 5 to waste heat boilers or to the chimney.

At the back of the furnace is the burner pipe 10 with which connects the supply pipe 12 which serves for delivering coal, oil or other fuel to the burner pipe 10. The pipe 14 also connecting into burner pipe 10 connects through valve 23 and pump 16 to a source of air as by opening into the atmosphere. The valves 22 and 23 may be used for cutting off or regulating the different materials fed to the furnace.

In the practice of the method of my invention with the type of furnace shown in the drawing, a charge of crude copper, for example, may be laid on the elevated part of the hearth 2 through the charging openings 7. After the furnace has been charged and the openings closed the metal of the charge is melted by burning powdered coal or oil blown under pressure through pipes 12 and 10. Samples of the material charged into the furnace and of the fuel used may be analyzed for impurities such as sulphur, antimony, lead, arsenic and the like and air fed by means of pump 16 through pipes 14 and 10 into the combustion chamber. The amount of air may be regulated in accordance with the nature and composition of the impurities found in the charge and in the fuel and also in accordance with the nature of the fuel itself.

During the melting process quantities of the metal in the charge are melted whereupon they flow from the surface of the charge, and impurities on and at the surface are oxidized and pass into the furnace gases or into the slag. Upon the melting of metal and oxidation of impurities from a charge surface a new surface is exposed from which in turn metal is molten and impurities are removed. The molten metal flows along the portion 2 of the hearth and into the collecting basin 3.

As the melt progresses samples of the molten metal are taken from time to time and the amount of air fed into the furnace chamber may be regulated in accordance therewith, whereby impurities in the furnace charge may be oxidized and volatilized or passed into the slag. The amount of air may also be regulated in accordance with the impurities in the fuel to oxidize such impurities and volatilize them or send them into the slag. After completion of the action the slag and the melt may be tapped from the furnace in the usual manner.

It is to be understood that the steps in the method and process of this invention may be substantially varied in accordance with the nature of the charge and of the impurities therein and also in accordance with the nature of the fuel used and the impurities occurring in that. In any case the atmosphere in the smelting chamber is varied in accordance with the nature of the charge and of the fuel and of the impurities carried thereby. This control and regulation of the chamber atmosphere is carried on throughout the process of melting in accordance with conditions in the furnace as determined from time to time by sampling the melt, the slag and the fuel.

It is also to be understood that in place of burning coal or oil in the combustion chamber that hot gases from hand fired coal, coke or other fuel may be blown into the combustion chamber for melting the charge.

While I have shown and described and have pointed out in the annexed claims certain novel features of the apparatus of the invention and certain novel steps in the method and process of the invention, it will be understood that various omissions, substitutions and changes in the forms and details of the apparatus illustrated and in its operation may be made by those skilled in the art without departing from the spirit of the invention.

Having described my invention, I claim:

1. The method of melting and refining copper which comprises impinging hot combustion gases against the surface of a charge of copper and thereby progressively melting the copper while subjected to a purifying atmosphere, and controlling said purifying atmosphere by regulating the amount of air and fuel used in the formation of said combustion gases in accordance with the nature and composition of the impurities present in the charge, said regulation being effected in accordance with periodic determinations of the character and amount of impurities present in the molten copper.

2. The method of melting and refining copper which comprises impinging heating gases of a substantially uniform mixture against the surface of a charge of copper, continuously draining molten material away from the charge and thus exposing fresh surfaces of the charge to the action of the heating gases, carefully and minutely controlling the chemically reactive quality of the heating gases so that they will be maintained in substantial chemical equilibrium with the copper but oxidizing with respect to the impurities, said control being effected in accordance with periodic determinations of the character and amount of impurities present in the molten copper.

In testimony whereof I have hereunto set my hand.

HARRY H. ALEXANDER.